(12) United States Patent
South et al.

(10) Patent No.: US 8,057,938 B1
(45) Date of Patent: Nov. 15, 2011

(54) STRUCTURAL FUEL CELLS AND COMPONENTS THEREOF

(75) Inventors: Joseph T. South, Bel Air, MD (US); Eric D. Wetzel, Baltimore, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1067 days.

(21) Appl. No.: 11/594,861

(22) Filed: Nov. 9, 2006

Related U.S. Application Data

(60) Provisional application No. 60/735,991, filed on Nov. 9, 2005.

(51) Int. Cl.
*H01M 8/00* (2006.01)
*H01M 8/24* (2006.01)

(52) U.S. Cl. ........................................ 429/400; 429/452

(58) Field of Classification Search .................. 429/400, 429/452
See application file for complete search history.

(56) References Cited

U.S. PATENT DOCUMENTS

| | | |
|---|---|---|
| 4,001,656 A | 1/1977 | Voyles |
| 4,535,382 A | 8/1985 | Wada et al. |
| 5,121,301 A | 6/1992 | Kurabayashi et al. |
| 5,168,421 A | 12/1992 | Suzuki et al. |

(Continued)

FOREIGN PATENT DOCUMENTS

JP  04160705 A  6/1992

(Continued)

OTHER PUBLICATIONS

South et al., Multifunctional Power-Generating and Energy-Storing Structural Composites for U.S. Army Applications, Mater. Res. Soc. Symp. Proc. vol. 851, 2005 Material Research Society, pp. NN4.6.1-NN4.6.12.*

(Continued)

*Primary Examiner* — Karie O'Neill Apicella
(74) *Attorney, Agent, or Firm* — William V. Adams; Christos S. Kyriakou

(57) ABSTRACT

A structural fuel cell includes a first and a second electrically conductive electrode plate each comprised of a porous, open-cell material. A proton conductive membrane is disposed between the first and second plates, and a skin encloses the electrode plates and membrane. The structural fuel cell is fabricated from high strength materials, and the porous, open-cell material of the electrode plates may comprise a metal foam, a honeycomb structure, or other such expanded structure. The skin may comprise a composite material such as a reinforced polymer. In some instances, the combination of the electrode plates, membrane and skin has a flexural strength between 1-100 MPa, or a flexural stiffness between 0.1-10 GPa.

20 Claims, 1 Drawing Sheet

U.S. PATENT DOCUMENTS

| | | | |
|---|---|---|---|
| 5,176,969 A | | 1/1993 | Miyabayashi et al. |
| 5,180,645 A | | 1/1993 | More |
| 5,212,026 A | | 5/1993 | Mitchell |
| 5,230,968 A | | 7/1993 | Bones et al. |
| 5,360,686 A | | 11/1994 | Peled et al. |
| 5,478,668 A | | 12/1995 | Gozdz et al. |
| 5,567,544 A | | 10/1996 | Lyman et al. |
| 5,793,603 A | | 8/1998 | Lyman |
| 5,898,561 A | | 4/1999 | Mandelcorn et al. |
| 6,022,634 A | * | 2/2000 | Ramunni et al. ............... 429/34 |
| 6,092,269 A | | 7/2000 | Yializis et al. |
| 6,224,994 B1 | | 5/2001 | Asukabe et al. |
| 6,404,615 B1 | | 6/2002 | Wijeyesekera et al. |
| 6,942,942 B2 | | 9/2005 | Haltiner, Jr. et al. |
| 6,981,671 B1 | | 1/2006 | Baron et al. |
| 7,057,881 B2 | | 6/2006 | Chow et al. |
| 7,486,498 B2 | | 2/2009 | Welsch et al. |
| 7,855,017 B1 | | 12/2010 | Snyder et al. |
| 7,864,505 B1 | | 1/2011 | O'Brien et al. |
| 2003/0169558 A1 | | 9/2003 | Olson et al. |
| 2004/0013932 A1 | * | 1/2004 | Miyazawa et al. ............ 429/38 |
| 2005/0168919 A1 | | 8/2005 | Welsch et al. |
| 2006/0147780 A1 | * | 7/2006 | Jiang et al. ................... 429/34 |
| 2006/0171100 A1 | | 8/2006 | Uematsu et al. |
| 2007/0027246 A1 | | 2/2007 | Shin et al. |

FOREIGN PATENT DOCUMENTS

| | | |
|---|---|---|
| JP | 2002-305031 | 10/2002 |

OTHER PUBLICATIONS

Kumar, et al. "Modeling of polymer electrolyte membrane fuel cell with metal foam in the flow filed of the bipolar/end plates" J Power Sources. v114 p. 54-62. 2003.

Kumar, R, et al. "Materials and design development for bipolar/end plates in fuel cells" J Power Sources. v129 p. 62-67. 2004.

South et al., Multifunctional Power-Generating and Energy-Storing Structural Composites for U.S. Army Applications, Mater. Res. Soc. Symp. Proc. vol. 851, 2005 Material Research Society, pp. NN4.6.1-NN4.6.12.

Thomas, et al. "Mechanical design and performance of composite multifunctional materials" Acta Materialia, 52, 2155-2164 (2004).

Luo, et al. "Carbon-Fiber/Polymer-Matrix Composites as Capacitors" Comp. Sci. Tech., 61, 885-888 (2001).

* cited by examiner

STRUCTURAL FUEL CELLS AND COMPONENTS THEREOF

CROSS-REFERENCE TO RELATED APPLICATIONS

This application claims priority of U.S. Provisional Patent Application Ser. No. 60/735,991 entitled "Structural Composite Fuel Cell," filed Nov. 9, 2005.

GOVERNMENT INTEREST

The invention described herein may be manufactured, used, and licensed by or for the United States Government.

FIELD OF THE INVENTION

This invention relates generally to fuel cells which operate to generate electrical energy. More specifically, the invention relates to fuel cells which are configured to function as structural elements of devices in which they are incorporated.

BACKGROUND OF THE INVENTION

Fuel cells are electrical devices in which the controlled oxidation of a fuel, in a chemical reaction, produces a flow of electrical energy. A typical fuel cell includes a first and a second electrode assemblies which are separated by a semi-permeable membrane. One of the electrode assemblies is configured and operative to deliver a fuel to the cell and the other electrode assembly is configured to deliver an oxidizer to the cell. In a typical fuel cell, one component of the oxidative chemical reaction, such as a proton from the fuel, diffuses through the membrane to react with another component of the reaction mixture such as oxygen or the like. The membrane does not allow for the passage of electrons therethrough; therefore, in order for the reaction to be completed, electron flow must take place from one electrode to the other through an external circuit, and it is this flow of current which is driven by the chemical reaction and comprises the power generated by the fuel cell. In many applications, a plurality of such cells are stacked together in an electrically interconnected relationship so as to provide appropriate levels of voltage and power.

Fuel cells are silent in operation and capable of reliably delivering power for so long as fuel is supplied thereto. As such, fuel cells have many diverse applications. In many instances, fuel cells are used in mobile applications for powering propulsion systems, communication systems, monitoring systems, and specialized electronics. In many instances, space and/or weight burden is at a premium in such applications and such size and weight constraints have limited the utility and practicality of particular fuel cell based systems. As will be described in detail hereinbelow, the present invention recognizes that by the appropriate selection of materials, fuel cells may be manufactured which combine very good structural properties such as strength and stiffness together with good power generating capability. Such fuel cells may be used to form structural elements of systems in which they are incorporated and hence are referred to herein as "structural fuel cells." Such structural fuel cells may be employed as body panels, supports, struts, frame members or other such components of vehicles. Likewise, structural fuel cells may be utilized to form housings, containers, fuel tanks and other structures used in conjunction with particular equipment. As will be explained hereinbelow, through the appropriate selection of materials and configurations, structural fuel cells may be optimized to provide appropriate combinations of properties such as strength, stiffness and the like in conjunction with good electrical operational efficiencies.

BRIEF DESCRIPTION OF THE INVENTION

Disclosed is a structural fuel cell assembly which includes a first and a second electrically conductive electrode plate. Each plate is comprised of a porous, open-cell material. A proton conductive membrane assembly is disposed between the first and second electrode plates, and a skin member encloses the first and second electrode plates together with a membrane which is disposed therebetween. The skin may be a composite member which comprises a matrix material, such as a polymeric material, having a reinforcing material disposed therein. This reinforcing material may comprise a material such as carbon, minerals, ceramics, glass, organic polymers such as polyimides or aramid polymers. The reinforcing material may be in the form of fibers or it may be in the form of particles, spheres, plates, sheets or the like.

The porous, open-cell material of the plates may comprise a metal, carbon, or combinations thereof such as carbon coated with a metal. In other instances, the porous structure may comprise an electrically insulating material coated with an electrically conductive material. In some instances, the porous, open-cell material may comprise a foam; whereas, in other instances, it may comprise a honeycomb material, a mesh, or other such expanded structures. In particular instances, the material comprising at least one of the electrode plates may have a catalytic material disposed thereupon.

The membrane component of the fuel cell may comprise a body of a sulfonated polymer, which in particular instances may be a sulfonated fluoropolymer. The membrane assembly may further include a reinforcing material which is laminated to, or disposed within, the membrane itself. The membrane assembly may also include current collecting structures, such as a metal mesh, disposed thereupon. In particular instances, the fuel cell assembly is configured so that the flexural strength of the combination of the first and second electrode plates, membrane assembly, and skin is between 0.1-1000 MPa, or in specific instances between 1-100 MPa. In other instances, the fuel cell assembly is configured so that the flexural stiffness of the combination of the first and second plates, membrane assembly, and skin is between 0.01-100 GPa, or in specific instances between 0.1-10 GPa.

DETAILED DESCRIPTION OF THE INVENTION

Figure 1:
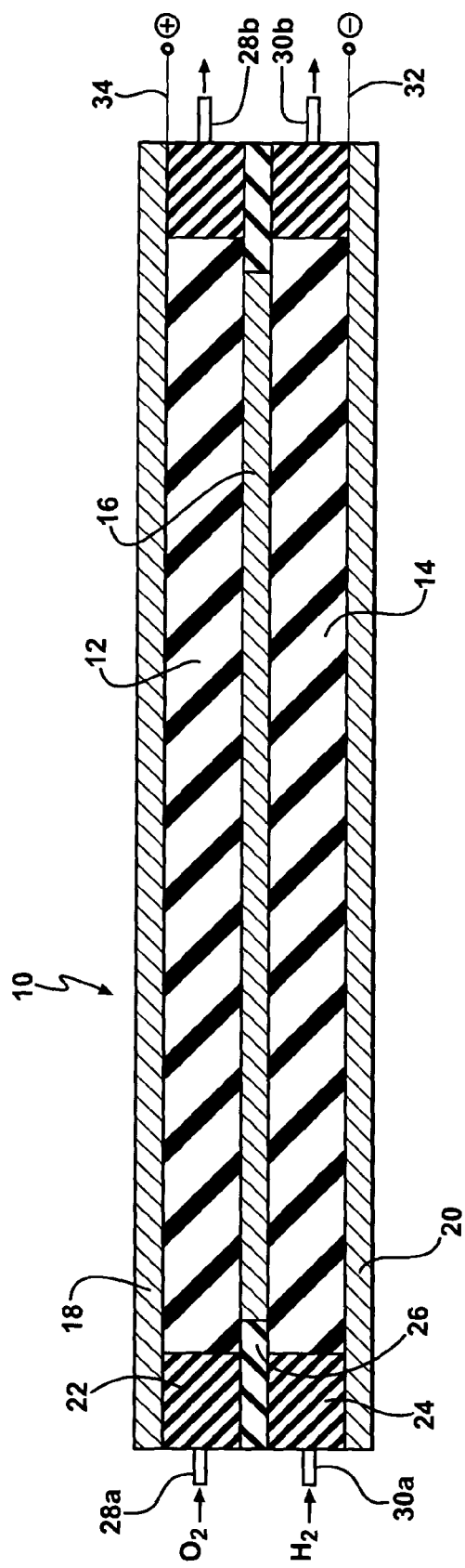
FIG. 1 is a cross-sectional view of one fuel cell assembly in accord with the present invention.

Structural fuel cell assemblies of the present invention include components which, in addition to functioning as active portions of the fuel cell, have sufficient mechanical strength so that the resultant fuel cell can serve as a structural component of an article of manufacture. As mentioned above, typical fuel cells include a pair of electrode plates, also referred to in the art as bipolar plates. These plates serve as electrodes of the fuel cell and also function to deliver fuel and oxidant to the cell. In use, the plates are separated by a membrane assembly which operates to allow selected reactive species to pass therethrough while preventing electron flow. In accord with the present invention, the electrode plates may be made from relatively high-strength materials so as to enhance the strength of the resultant fuel cell. In a typical application, a fuel cell will also include an outer skin or container material which encloses the electrode plates and membrane so as to contain the reactive materials therein. Further in accord with the present invention, this skin or casing material can be made from a high-strength material, such as a composite. In this manner, the outer skin will also contribute to the strength of the fuel cell.

There are a variety of fuel cell configurations which may be implemented in accord with the teaching presented herein. Referring now to FIG. 1, there is shown one general embodiment of a structural fuel cell assembly 10. The fuel cell assembly 10 of FIG. 1 includes a first electrode plate 12 and a second electrode plate 14, and a membrane assembly 16 disposed therebetween. An upper skin member 18 and a lower skin member 20 serve to contain the electrode plates 12, 14 and membrane 16.

In the illustrated embodiment, the first electrode plate 12 has a framelike gasket or sealing member 22 disposed about its perimeter. Likewise, the second electrode plate 14 has a framelike gasket member 24 disposed about its perimeter.

The membrane assembly 16 similarly includes a sealing gasket member 26 disposed about its perimeter. These gasket members 22, 24, 26 establish a fluid-tight seal between the top 18 and bottom 20, skin members, the electrode plates 12, 14 and the membrane 16. As illustrated, the gasket 26 associated with the membrane 16 is shown as being stepped away from the gaskets 22, 24 associated with the plates; however, it is to be understood that various other sealing configurations could be likewise utilized. Also, while three separate gasket members are shown, other sealing arrangements could be implemented in embodiments of this invention. For example, a single body of sealing material could be utilized as could be a larger or smaller number of gaskets.

As illustrated in FIG. 1, the first electrode plate 12 has a first set of conduits 28a, 28b associated therewith, and as illustrated, these conduits are operative to deliver oxygen to the first electrode plate, and exhaust waste products, typically water, therefrom. A second set of conduits 30a, 30b are associated with the second plate 14 and, as illustrated herein, are configured to deliver a stream of fuel, hydrogen gas in this instance, to the second electrode plate 14.

In the operation of the fuel cell of FIG. 1, the hydrogen fuel delivered to the second electrode plate 14 is dissociated and ionized to produce protons ($H^+$), generally by the action of a catalytic material associated with the electrode plate 14. The membrane 16 is permeable to protons, but is not electron conductive. Thus, as protons pass through the membrane, a net negative charge will accumulate on this second electrode plate, and this charge may be communicated to a terminal 32 in electrical communication therewith. Having passed through the membrane, the proton will react with oxygen, at the first electrode plate 12, in the presence of electrons which may flow thereto through a second terminal 34. The foregoing describes the operation of one type of fuel cell. It is to be understood that other fuel cell systems will utilize various other fuels such as alcohols, hydrocarbons and the like, and these may be employed in conjunction with oxidizing agents other than oxygen such as halogens and complex species. In any instance, all of such embodiments may be utilized in the fabrication of the presently disclosed structural fuel cells.

In accord with the present invention, at least one of the electrode plates 12, 14 is fabricated from a relatively high strength porous, open-cell material. In the context of this disclosure, an open-cell material is defined to include a material having a structure which will permit the passage of a fluid therethrough. As such, an open-cell structure includes foams as well as honeycomb structures, tubular structures, meshes, reticulated structures and the like. The material which forms the porous, open-cell electrode plates will, in most instances, be electrically conductive so as to allow for the collection and transfer of electrical current.

In some cases, it is desirable to increase the mechanical coupling between the first and second electrode plates to improve the structural performance of the overall fuel cell assembly. One approach for providing this mechanical coupling is to shape, notch, groove, or cut the electrode plates such that they mechanically interlock with each other. Another approach is to use small regions of adhesive to directly bond the electrode plates through the membrane assembly.

One group of materials which may be utilized as electrode plates comprise metal foams, and such metals may include, for example, aluminum, steel including stainless steel, nickel, copper, titanium or the like. In other instances, the electrode plates may be fabricated from carbon foams, such as reticulated, vitreous carbon foams. In particular instances, the electrodes may comprise composite structures. For example, a carbon foam material may be coated with one or more layers of metal so as to enhance its electrical conductivity. In yet other instances, the electrode structures may be fabricated from ceramics, polymers, glasses or other nonelectrically conductive materials, provided that they are coated with a metal or other electrically conductive material. In certain instances, one or more of the electrode plates may also be coated with a layer of a catalytic material which enhances the chemical reactions of the fuel cell. Such catalytic materials include noble metals such as platinum, palladium, ruthenium and the like. There are a variety of techniques known in the art for depositing catalytic coatings of such materials, including chemical deposition, pyrolysis, vapor techniques and the like, and all of these methods may be readily implemented by those of skill in the art.

As mentioned above, the open-cell, porous electrode plates may be prepared utilizing honeycomb structures, mesh structures or other such expanded material structures. The foregoing open cellular structures will provide both high strength and relatively light weight; hence, fuel cells which incorporate these members will have good structural properties.

The other skin portions 18, 20 of the fuel cell assembly of FIG. 1 also can provide significant structural integrity. These members may, in particular instances, be fabricated from high strength lightweight material such as composites. These composites, as is known in the art, may comprise a polymeric matrix having a reinforcing material disposed therein. The reinforcing material may comprise fibers which may be in the form of fabrics or other such oriented structures or they may be in the form of random fibers. The fibers may comprise a high-strength material such as carbon fibers, ceramic fibers, glass fibers, other mineral fibers, or they may comprise polymeric fibers such as polyimides and aramids, including materials sold under the trademark Kevlar®, or they may include metal fibers, such as copper, stainless steel, aluminum, or titanium. In some particular instances, the polymeric material of the matrix may comprise a polyurethane, an epoxy, a phenolic, or vinyl esters. The reinforcing material may also be configured as plates, sheets, spheres, particles, or the like.

In some instances, the skin material itself may be electrically conductive, and may contribute to the collection and transfer of electrical current in the system. Electrically conductive skin materials could include composites with a polymeric matrix and reinforcing fibers, where the fibers are composed of electrically conductive materials such as carbon or metal, including copper, stainless steel, aluminum, or titanium.

In further instances, the gaskets or other sealing members may likewise comprise high-strength materials, and one particular group of materials which may be utilized comprises polymer/fabric composites. In such instance, the gasket materials may be comprised of a fibrous material impregnated with a curable polymeric material utilizing known "prepreg" technology.

The membrane component of the fuel cell will, as mentioned above, function to selectively allow particular chemical species to pass therethrough. One particular group of membrane materials used in various fuel cells comprises sulfonated polymers, and a particular set of such materials comprises sulfonated fluoropolymers. One such group of membrane materials is known and available in the art under the designation Nafion®.

As is known in the art, the membranes typically include further structures, and hence are described herein as membrane assemblies. Typically Nafion® or other such membrane materials are combined with reinforcing and supporting bodies. For example, a membrane assembly may include a semi-permeable body of polymeric material interposed between a supporting mesh of glass fibers or the like. In other instances, reinforcing or supporting materials may be incorporated directly into the active membrane material. In yet other instances, metal meshes or other such electrically conductive current-collecting devices may be included in the membrane structures, particularly in those instances where the electrical conductivity of the electrode plates is relatively low. All of such embodiments and modifications as are known in the art may be utilized in the manufacture of the presently disclosed structural fuel cells.

The fuel cell assembly can be fabricated using a range of manufacturing methods known to those skilled in the art of composites and composite assembly fabrication. The skins and gaskets may consist of comprised of a fibrous material impregnated with a curable polymeric material utilizing known "prepreg" technology, or they may consist of dry fibrous reinforcement that is infused with flowable prepolymer, or the assembly may use various flowable and film forms of adhesive. In other cases, the prepreg may consist of melt-formable thermoplastic materials, polymerizable thermoplastic prepolymers, or solvent containing dissolved polymer. In all cases, a combination of pressure, time, elevated temperature, and or radiation is used to consolidate or cure the matrix material and bond together the material layers in the assembly.

While FIG. 1 shows a fuel cell assembly which includes two electrode plates and a single membrane, it is to be understood that in many practical applications, fuel cell structures comprise a plurality of membrane and electrode subsets which are electrically interconnected in a series, parallel, or mixed series/parallel electrical relationship. Those subassemblies may be disposed in separate housings or they may be all enclosed within a single skin member.

The structural fuel cells disclosed herein, owing to their construction, will have very good mechanical properties. Typically, the combination of electrode plates and enclosing skin will be such that the maximum flexural stress sustainable by this combination will be between 0.1-1000 MPa, and in particular instances will be between 1-100 MPa. In other configurations, the combination of electrode plates and enclosing skin will be such that the maximum flexural stiffness provided by this combination will be between 0.01-100 GPa, and in particular instances, between 0.1-10 GPa.

While FIG. 1 shows a structural fuel cell assembly as being a relatively flat plate member, the fuel cells hereof may be fabricated in a variety of configurations. For example, fuel cells may be fabricated to have a cylindrical or other curved configuration, and such fuel cells may function as tanks or other containers for retaining the operating fuels therein. In other instances, fuel cells may be fabricated as housings or casings for electrical systems which they are powering. In yet other instances, the fuel cells may be configured as portions of an air frame of an electrically powered aircraft, or as a hull of a watercraft or as a body panel of a land vehicle. In cases of human portable equipment, fuel cells may be fabricated as portions of protective clothing such helmets, armor and the like, or they may comprise pack containers or other such structures.

It is to be understood that the foregoing drawing, discussion and description is illustrative of some specific embodiments of the present invention. In view of the teaching set forth herein, other embodiments, modifications and variations thereof will be apparent to those of skill in the art. The foregoing drawing, discussion and description are not intended to be a limitation upon the practice of the present invention. It is the following claims, including all equivalents, which define the scope of the invention.

The invention claimed is:

1. A structural fuel cell assembly that is included as a structural element in a device into which the structural fuel assembly is incorporated, the structural fuel cell assembly comprising:
    a first, electrically conductive, electrode plate comprised of a porous open-cell material;
    a second, electrically conductive, electrode plate comprised of a porous open-cell material;
    a proton conductive membrane assembly disposed between said first electrically conductive electrode plate and said second electrically conductive electrode plate[s]; and
    a skin which encloses said first electrically conductive plate and said second electrically conductive electrode plate[s] and the membrane disposed therebetween,
    wherein the flexural strength of the combination of the first electrically conductive electrode plate, the second electrically conductive electrode plate, the membrane assembly, and the skin is between 0.1 MPa and 1000 MPa, and
    the flexural stiffness of the combination of the first electrically conductive electrode plate, the second electrically conductive electrode plate, the membrane assembly, and the skin is between 0.1 GPa and 100 GPa.

2. The fuel cell assembly of claim 1, wherein said skin is a composite skin comprising a matrix material having a reinforcing material disposed therein.

3. The fuel cell assembly of claim 2, wherein said reinforcing material comprises a fibrous material selected from the group consisting of carbon, minerals, ceramics, glass, organic polymers, metals, and combinations thereof.

4. The fuel cell assembly of claim 1, wherein said first and second electrode plates are mechanically or adhesively coupled together.

5. The fuel cell assembly of claim 2, wherein said matrix comprises an organic polymer selected from the group consisting of polyurethanes, epoxies, vinyl esters, phenolics, and combinations thereof.

6. The fuel cell assembly of claim 1, wherein the porous material of at least one of said first and second electrode plates comprises a material selected from the group consisting of metals, carbon, and combinations thereof.

7. The fuel cell assembly of claim 1, wherein the porous body of at least one of said first and second electrode plates comprises a body of an open-cell foam material.

8. The fuel cell assembly of claim 1, wherein the porous material of at least one of said first and second electrode plates comprises a honeycombed material.

9. The fuel cell assembly of claim 1, wherein the porous material of at least one of said first and second electrode plates includes a catalyst disposed thereupon.

10. The fuel cell assembly of claim 1, wherein said membrane assembly includes a membrane fabricated from a sulfonated polymer.

11. The fuel cell assembly of claim 10, wherein said sulfonated polymer is a sulfonated fluoropolymer.

12. The fuel cell assembly of claim 1, wherein said membrane assembly includes a reinforcing material.

13. The fuel cell assembly of claim 1, wherein said membrane assembly includes a current collector which is in electrical communication with at least one of said electrode plates.

14. The fuel cell assembly of claim 13, wherein said current collector comprises a metal mesh.

15. The fuel cell assembly of claim 13, wherein said at least a portion of said skin is electrically conductive and functions as said current collector.

16. The fuel cell assembly of claim 1, further including a first fluid delivery conduit in fluid communication with said first electrode plate, said first fluid delivery conduit being operative to deliver a fuel to said first electrode plate; and a second fluid delivery conduit in fluid communication with said second electrode plate, said second fluid delivery conduit being operative to deliver an oxidizer to said second electrode plate.

17. The fuel cell assembly of claim 1, wherein the structural element is a body panel, a support, a strut, or a frame member, a housing, a container, a fuel tank, an airframe or a hull.

18. The fuel cell assembly of claim 17, wherein the flexural strength of said combination of first and second electrode plates, membrane assembly and skin is between 1-100 MPa.

19. The fuel cell assembly of claim 1, wherein the structural element is a portion of protective clothing.

20. The fuel cell assembly of claim 19, wherein the flexural stiffness of said combination of first and second electrode plates, membrane assembly and skin is between 0.1-10 GPa.

* * * * *